United States Patent [19]

Kelly et al.

[11] Patent Number: 5,727,083
[45] Date of Patent: Mar. 10, 1998

[54] CORRECTION OF ERRORS IN FACSIMILE TRANSMISSIONS

[75] Inventors: Phillip L. Kelly, Sunnyvale; Daryl A. Kaiser, Los Gatos, both of Calif.

[73] Assignee: Applied Signal Technology, Inc., Sunnyvale, Calif.

[21] Appl. No.: 394,328

[22] Filed: Feb. 23, 1995

[51] Int. Cl.⁶ .............................. H04N 1/415; H04N 1/00
[52] U.S. Cl. ...................... 382/232; 358/261.3; 358/436
[58] Field of Search ............................ 358/261.1, 261.2, 358/261.3, 426, 434, 436, 447; 371/37.1, 37.7, 37.8, 40.2, 40.4, 30; 382/232; H04N 1/419

[56] References Cited

U.S. PATENT DOCUMENTS

| | | |
|---|---|---|
| 3,927,251 | 12/1975 | White et al. ........................ 358/261.3 |
| 4,989,088 | 1/1991 | Wada et al. . |
| 5,031,179 | 7/1991 | Yoshida et al. . |
| 5,426,652 | 6/1995 | Heiman . |
| 5,533,033 | 7/1996 | Ratner ........................................ 371/30 |

OTHER PUBLICATIONS

"FAX: Digital Facsimile Technology and Applications" (Second Edition), Bodson, et al., 1992, pp. 19-92; pp. 145-167.

Primary Examiner—Edward L. Coles, Sr.
Assistant Examiner—Kimberly A. Williams
Attorney, Agent, or Firm—Townsend and Townsend and Crew LLP

[57] ABSTRACT

A technique for improving the image quality of facsimile transmissions by actually recovering data corrupted by channel impairments without retransmission. The technique is adaptable to operate with existing facsimile communications standards and does not require modification of transmitter equipment. A significant increase in image quality results. In many cases, otherwise partially illegible documents can be read by applying the image correction technique of the invention.

5 Claims, 11 Drawing Sheets

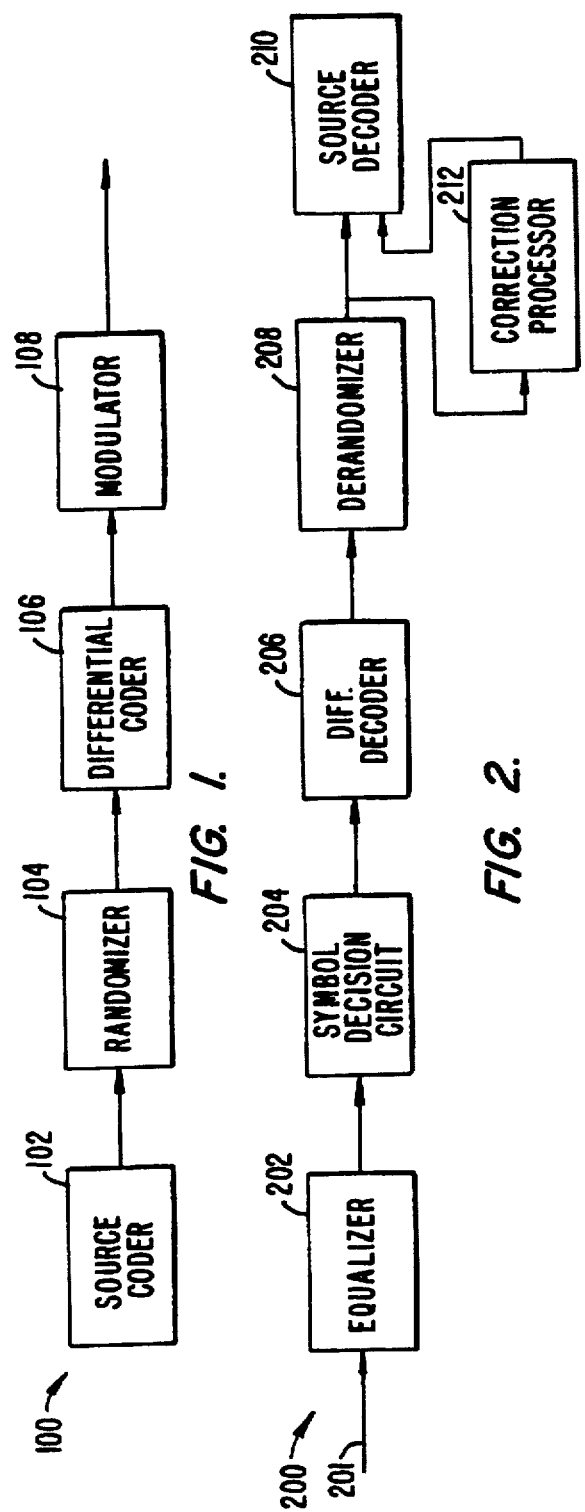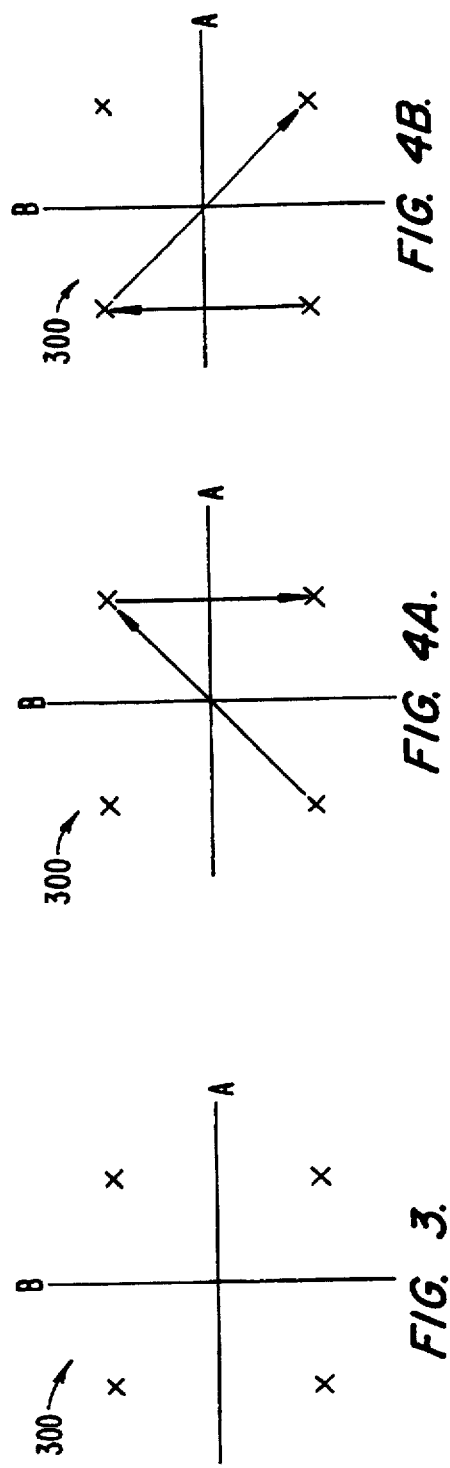

■ BLACK PIXEL
□ WHITE PIXEL
▨ DON'T CARE

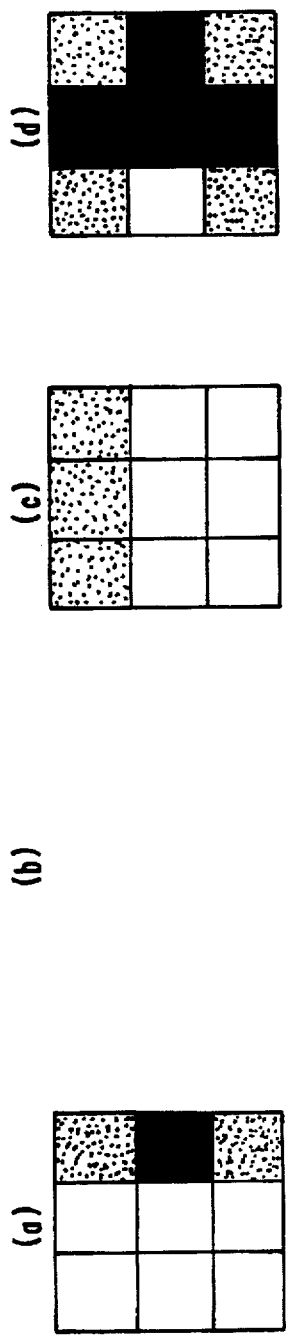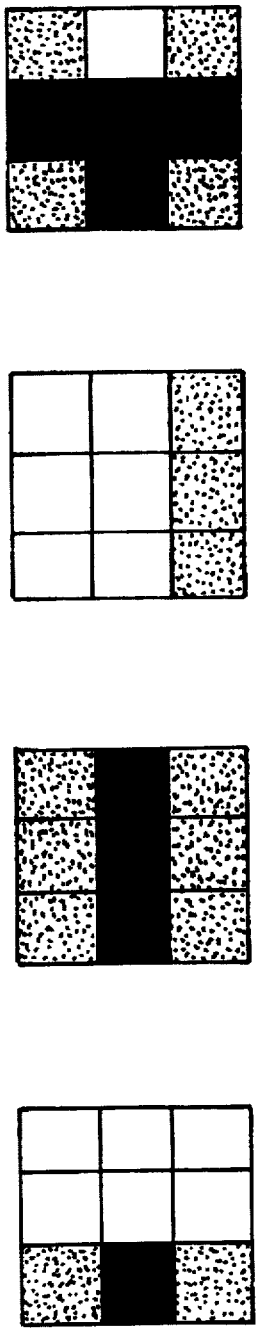
FIG. 11A. FIG. 11B. FIG. 11C. FIG. 11D. ADJUSTMENT VALUES: (a) -2, (b) +10, (c) -2, (d) +10, ALL OTHERS ZERO. ADDITIONAL CONSTRAINTS ON SHADED PIXELS: (b) AT LEAST ONE BLACK PIXEL IN EACH SHADED ROW AND AT LEAST THREE BLACK PIXELS OVERALL; (c) LESS THAN THREE BLACK PIXELS; (d) AT LEAST ONE BLACK PIXEL (a) (b) (c)
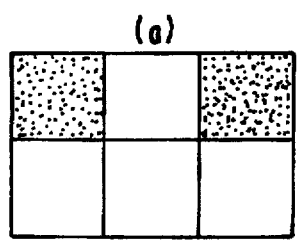 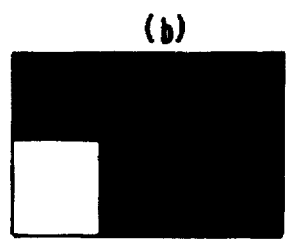
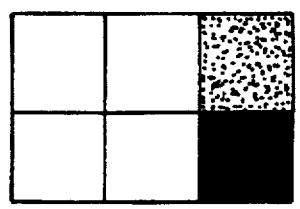  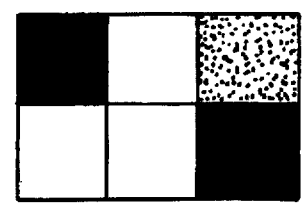
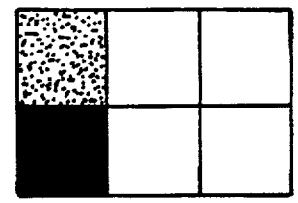  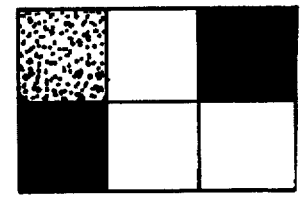
FIG. 12A.   FIG. 12B.   FIG. 12C.
 BLACK PIXEL
 WHITE PIXEL
 DON'T CARE
ADJUSTMENT VALUES: (a)-2, (b)+10, (c)-1, ALL OTHERS ZERO (a)
(b)
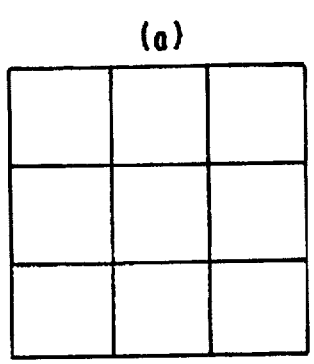
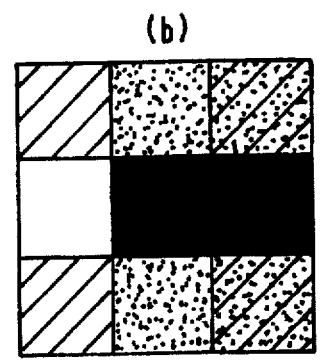
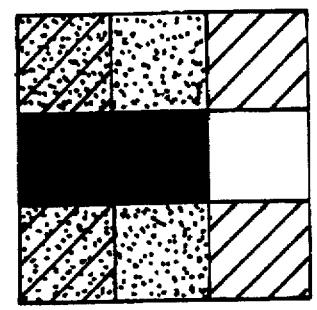
FIG. 13A.   FIG. 13B.
 BLACK PIXEL     ONE OR MORE BLACK
 WHITE PIXEL    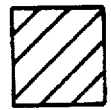 ONE OR MORE WHITE
 DON'T CARE
ADJUSTMENT VALUES: (a) +1, (b) +10, ALL OTHERS ZERO

10/11

Applied
Signal
Technology, Inc.

To:
From: Daryl Kaiser, Applied Signal Technology, Inc.
408-522-3338 voice  408-730-8537 fax
Subject: Test page for ICR
Date: 2 October 1992

This test page uses serif and sans serif typefaces, each at two different sizes.

First, a serif typeface at 12 points. The quick brown fox jumps over the lazy dog. Twelve point Palatino. Throughout the derivation and analysis of the error model, a proper perspective is useful in separating the characteristics that are important from those that are merely interesting. Above all, the unique bit error patterns are important since these are the patterns that must be corrected in degraded fax bit streams. The number of patterns and their relative probabilities are important since they determine the number of correction patterns that may have to be applied to the bit stream and the order in which correction patterns are applied. How about punctuation? Try it out!

Next, a sans serif typeface at 12 points. The quick brown fox jumps over the lazy dog. Twelve point Helvetica. Throughout the derivation and analysis of the error model, a proper perspective is useful in separating the characteristics that are important from those that are merely interesting. Above all, the unique bit error patterns are important since these are the patterns that must be corrected in degraded fax bit streams. The number of patterns and their relative probabilities are important since they determine the number of correction patterns that may have to be applied to the bit stream and the order in which correction patterns are applied. How about punctuation? Try it out!

Decoded Image from V.29/9600 Signal with Additive Noise.

FIG. 14.

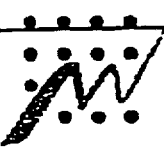 Applied Signal Technology, Inc.

To:
From: Daryl Kaiser, Applied Signal Technology, Inc.
408-522-3338 voice   408-730-8537 fax
Subject: Test page for ICR
Date: 2 October 1992

This test page uses serif and sans serif typefaces, each at two different sizes.

First, a serif typeface at 12 points. The quick brown fox jumps over the lazy dog. Twelve point Palatino. Throughout the derivation and analysis of the error model, a proper perspective is useful in separating the characteristics that are important from those that are merely interesting. Above all, the unique bit error patterns are important since these are the patterns that must be corrected in degraded fax bit streams. The number of patterns and their relative probabilities are important since they determine the number of correction patterns that may have to be applied to the bit stream and the order in which correction patterns are applied. How about punctuation? Try it out!

Next, a sans serif typeface at 12 points. The quick brown fox jumps over the lazy dog. Twelve point Helvetica. Throughout the derivation and analysis of the error model, a proper perspective is useful in separating the characteristics that are important from those that are merely interesting. Above all, the unique bit error patterns are important since these are the patterns that must be corrected in degraded fax bit streams. The number of patterns and their relative probabilities are important since they determine the number of correction patterns that may have to be applied to the bit stream and the order in which correction patterns are applied. How about punctuation? Try it out!

Decoded Image from V.29/9600 Signal After Correction with Additive Noise Patterns.

FIG. 15.

CORRECTION OF ERRORS IN FACSIMILE TRANSMISSIONS

STATEMENT OF GOVERNMENT RIGHTS

The United States Government has rights in this invention.

BACKGROUND OF THE INVENTION

The present invention relates generally to the improvement of image quality in facsimile transmissions and particularly to schemes that detect and correct errors in facsimile transmission.

Facsimile transmission has become perhaps the predominant mode for electronically communicating text and graphical images. Facsimile is highly suitable for communicating traditional business correspondence. Furthermore, the necessary equipment is by now ubiquitous, being found in virtually all businesses and even in many households. The advantages of facsimile are perhaps even greater for international correspondence, since mail delivery to overseas locations is typically slow and other forms of electronic communication such as electronic mail are as yet not universal.

One drawback to the facsimile mode of communication is that image quality can be impaired by factors beyond the control of the recipient. In particular, channel impairments can cause corruption of received image data. In accordance with current facsimile communications standards, receiving equipment is expected to detect errors during reception. These errors can often be isolated to one or more adjacent lines in an image.

When errors are detected, many facsimile machines will either discard the corrupted data, discard the corrupted data and duplicate the previous line, or discard a portion of the corrupted data and replace it with white fill. These are image enhancement techniques that make no attempt to recover the original data.

An optional feature of facsimile is an error correction mode (ECM) where the transmitter segments an image into packets and appends a cyclic redundancy check (CRC) sum. The receiver is expected to use the CRC value to detect errors, and, if necessary, request retransmission of data.

SUMMARY OF THE INVENTION

The invention provides a technique for improving the image quality of facsimile transmissions by actually recovering data corrupted by channel impairments without retransmission. The technique is adaptable to operate with existing facsimile communications standards and does not require modification of transmitter equipment. The invention provides a significant increase in image quality. In many cases, otherwise partially illegible documents can be read by applying the image correction technique of the invention.

In accordance with the invention, facsimile reception errors are corrected by taking advantage of a recognition of the compression and formatting mechanisms underlying facsimile communication standards. Normally, such standards specify at least a modulation format and accompanying signal constellation, a differential coding scheme, a polynomial that defines a randomization for equalizing the transmitted spectrum, and a source coding scheme for compressing the image data. Knowledge of how errors propagate through the necessary receiver equipment is used to generate suitable correction patterns.

In one embodiment, errors are detected by comparing the number of pixels in a received fully decoded image line to the known standard length. The invention then seeks to localize the error within the corrupted image line by applying error detection templates to the decoded image line.

Once a range of possible error locations has been defined in the corrupted image line, the known correction patterns for the relevant facsimile communication standard are applied at these positions. In accordance with the invention, the correction patterns are applied at a stage of receiver processing that follows demodulation and derandomization but precedes the removal of source coding. The correction patterns are applied at every possible alignment within the limited range. Possible alignments are limited by known symbol boundaries in the coded data.

This repeated application of correction patterns generates multiple candidate corrected image lines. For evaluation purposes, source coding is removed from the candidate corrected image lines. Candidate corrected image lines that do not have the standard length can be discarded immediately. However, the inventors have discovered that this alone is not sufficient to select a single most likely corrected image line. Further evaluation of the remaining candidates is necessary.

The invention provides a scoring system, wherein a group of scoring templates is applied to successive positions along the candidate corrected image lines. A numerical likelihood value is generated at each alignment of a scoring template to the image line. An overall likelihood value for the candidate line is generated by adding the scores generated at each alignment for each template in the group. The candidate line with the highest likelihood value is then selected to be the corrected image line. If none of the correction patterns produces an image line of standard length, then a line enhancer is applied directly to the decoded image line.

The image correction technique of the invention can also be applied at an intermediate point along the communication channel. In this case, the corrected image line is remodulated and retransmitted.

The invention will be better understood by reference to the following detailed description in connection with the accompanying drawings.

BRIEF DESCRIPTION OF THE DRAWINGS

FIG. 1 depicts some of the functional elements of a facsimile transmission modem;

FIG. 2 depicts a facsimile reception modem adapted with correction circuitry in accordance with the invention;

FIG. 3 depicts a so-called signal constellation representing QPSK, one known type of modulation used for facsimile;

FIGS. 4A-4B depict the difference between transmitted and received phase when a single symbol is received incorrectly;

FIGS. 11A–11D define the 3×3 pixel templates for a first scorer for evaluating candidate corrected image lines in accordance with the invention;

FIGS. 12A–12C define the 3×2 pixel groups for a second scorer for evaluating candidate corrected image lines in accordance with the invention;

FIGS. 13A–13B defines the 3×3 pixel groups for a third scorer for evaluating candidate corrected image lines in accordance with the invention;

FIG. 14 depicts a decoded image from a V.29/9600 image with additive noise; and

FIG. 15 depicts the decoded image of FIG. 14 corrected in accordance with the invention.

DESCRIPTION OF SPECIFIC EMBODIMENTS

Figure 5:
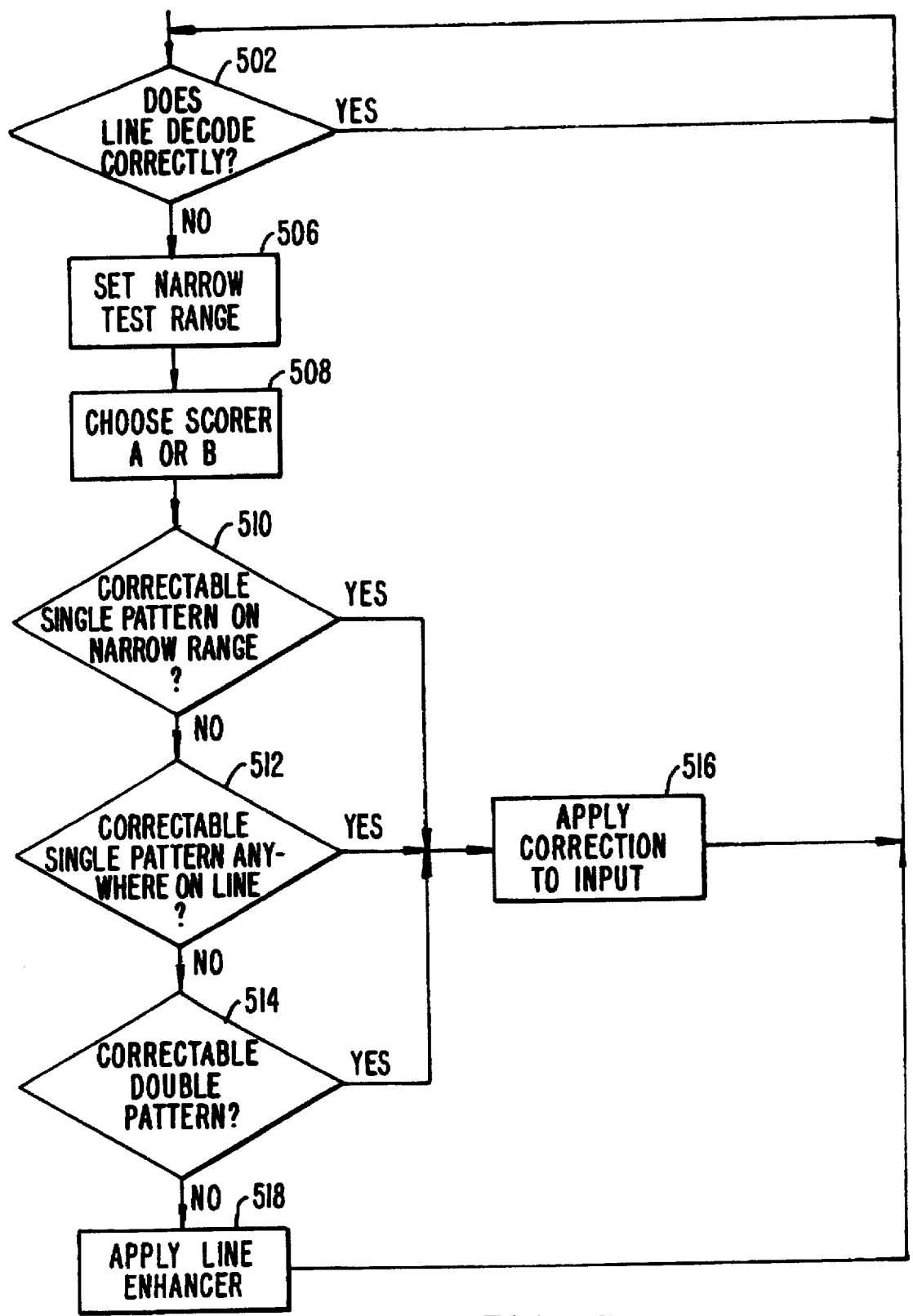
FIG. 5 is a top-level flow chart describing the steps of correcting errors in encoded facsimile signals in accordance with the invention.

Facsimile Communication:

FIG. 1 depicts some of the functional elements of a facsimile transmission modem 100. Modem 100 includes a source coder 102, a randomizer 104, a differential coder 106, and a modulator 108. The output of modulator 108 is typically connected to a telephone line 110.

Typically, the source code applied by source coder 102 is a run-length code such as a Huffman code or a so-called modified READ code as specified in CCITT Recommendation T.4. Randomizer 104 applies a Boolean polynomial to the coded data to level the spectrum of the modulated signal. Differential coder 106 differentially encodes the randomized data. Modulator 108 then applies the differentially encoded data to a carrier suitable for communications over the public telephone network in accordance with a predetermined signal constellation.

FIG. 2 depicts a facsimile reception modem 200 in accordance with the invention. Modem 200 is coupled to a channel 201, typically the public telephone network. Modem 200 includes a channel equalizer 202, a symbol decision circuit 204, a differential decoder 206, a derandomizer 208, and a source decoder 210. Symbol decision circuit 204 converts the equalized modulated signal to a sequence of differentially encoded symbols. Differential decoder 206 removes the differential coding applied by differential coder 106. Derandomizer 208 applies a Boolean polynomial that removes the effects of randomizer 104. In accordance with the invention, modem 200 is augmented with a correction processor 212 that accepts data from the output of derandomizer 208 and provides input to source decoder 210.

In one alternative embodiment, facsimile reception modem 200 is implemented within a conventional personal computer. Correction processor 212 may then be implemented as software running on the computer, as a separate peripheral device, or as an integral part of a specially adapted facsimile modem.

In another alternative embodiment, modem 200 is positioned at an intermediate point in a communication channel, e.g. at a telephone company central office. The output of correction processor 212 would then be fed to a randomizer, differential coder, and modulator before being reinjected into the communication channel.

A detailed description of facsimile communication technology is found in Bodson et al., *FAX: Digital Facsimile Technology and Applications*, 2nd Ed. (Artech House 1992), the contents of which are herein incorporated by reference.

Table 1 summarizes the basic characteristics of the most common facsimile communication standards.

TABLE 1

Facsimile Modem Characteristics

| Modem | Bits Per Second | Symbols Per Second | Bits Per Symbol | Constellation | Derandomizer |
|---|---|---|---|---|---|
| V.27 | 2400 | 1200 | 2 | QPSK | $1 + x^{-6} + x^{-7}$ |
| V.27 | 4800 | 1600 | 3 | 8 PSK | $1 + x^{-6} + x^{-7}$ |
| V.29 | 7200 | 2400 | 3 | 8 QAM | $1 + x^{-18} + x^{-23}$ |
| V.29 | 9600 | 2400 | 4 | 16 QAM | $1 + x^{-18} + x^{-23}$ |
| V.17 | 7200 | 2400 | 3 | 16 Trellis | $1 + x^{-18} + x^{-23}$ |
| V.17 | 9600 | 2400 | 4 | 32 Trellis | $1 + x^{-18} + x^{-23}$ |
| V.17 | 12000 | 2400 | 5 | 64 Trellis | $1 + x^{-18} + x^{-23}$ |
| V.17 | 14400 | 2400 | 6 | 128 Trellis | $1 + x^{-18} + x^{-23}$ |

The parameters given in Table 1 define the architecture of the individual components of modem 100 and modem 200 such as the randomizer 104, derandomizer 208, modulator 108 and symbol decision circuit 204.

Modulated data is thus transmitted on a channel with impairments such as noise, frequency offset, phase jitter, intermodulation distortion, gain and group delay distortion, interference and attenuation. Due to these impairments, the demodulator may make errors in the symbol decision which will result in one or more bit errors in a given symbol.

Each symbol decision error may include a phase component and/or magnitude component. If the error includes a phase component, the differential decoding process will produce errors in two adjacent decoded symbols. The derandomizer will then propagate these bit errors over a wide range of bits. Thus demodulation errors will introduce multiple bit errors. Symbol decision errors generate bit errors in specific patterns. Furthermore, n bit errors will span more than n bits due to the operation of derandomizer 208. Therefore, a relatively small list of correction patterns can be generated using knowledge of the modem's constellation, baud rate, and bit rate.

Construction of Correction Patterns:

Error patterns due to channel impairments depend not only on the type of channel impairment but also on the modulation format. As previously discussed, bit errors are introduced by incorrect symbol decisions, differential decoding, and derandomization. Therefore, in accordance with the invention, correction patterns are categorized based on the modulation format, bit rate, and baud rate. Because different channel impairments introduce different types of symbol decision errors, the number of correction patterns to consider depends on the channel impairments of interest.

The nature of the channel impairment also affects the duration of each error event. For example, additive noise tends to alter one symbol at a time (possibly two differential outputs), burst noise alters multiple adjacent symbols (three or more differential outputs). Phase hits, also, may rise and fall over a span of more than one symbol period, thereby affecting multiple adjacent symbols.

Given the disparate nature of impairments on each channel and the different effects of these impairments, the invention provides a methodology for constructing tables of correction patterns. These tables are customized for the impairments of interest for a given modem. For example, correction patterns for a channel containing only additive and impulsive noise can be generated and used to correct a signal. In this case, inclusion of correction patterns associated with burst or phase impairments would unnecessarily increase the processing time.

In the preferred embodiment, correction patterns optimized for additive noise are employed. It is has been discovered that application of these patterns produces the greatest improvement in image quality. The discussion of correction patterns herein will therefore concentrate on patterns that correct for additive noise. Those of skill in the art will realize that correction patterns can also be generated for the other kinds of channel impairments.

A primitive correction pattern is a bit pattern generated by including the effects of a modem's derandomizer on a single differential decoding error. These patterns serve as a useful starting point, but are not typically themselves the desired patterns because the desired patterns account for adjacent differential decoding errors. Tables 2 through 6 illustrate the primitive correction patterns for V.27 and V.29 signals. In these Tables, each mark (x) represents a complemented bit while each dash (—) represents an unaffected bit. For all signals, the patterns are organized according to the angle of phase error that generates the pattern. For V.29/9600, Table 6 shows the single pattern associated with a magnitude error.

TABLE 2

Primitive Correction Patterns for V.27/2400

| Angle | Bit Sequence | Hex Representation |
|---|---|---|
| ±90° | —x——xx—————— | 4180000 |
| ±90° | x———xx—————— | 830000 |
| 180° | xx——x-x—————— | C280000 |

TABLE 3

Primitive Correction Patterns for V.27/4800

| Angle | Bit Sequence | Hex Representation |
|---|---|---|
| ±45° | —x———xx—————— | 20C0000 |
| ±45° | -x———xx—————— | 4180000 |
| ±45° | x———xx——————— | 8300000 |
| ±90° | -xx———x-x————— | 6140000 |
| ±90° | x-x——x-x—————— | A3C0000 |
| ±135° | xxx——x—x—————— | E240000 |
| ±135° | -x———xx—————— | 4180000 |
| ±135° | x———xx——————— | 8300000 |
| 180° | xx——x-x—————— | C280000 |

TABLE 4

Primitive Correction Patterns for V.27/7200

| Angle | Bit Sequence | Hex Representation |
|---|---|---|
| ±45° | —x—————x——x— | 2000084 |
| ±45° | -x—————x——x— | 4000108 |
| ±45° | x——————x——x— | 8000210 |
| ±90° | -xx————xx——xx— | 600018C |
| ±90° | x-x———x-x——x-x— | A000294 |
| ±135° | xxx———xxx—xxx— | E00039C |
| ±135° | -x—————x——x— | 4000108 |
| ±135° | x——————x——x— | 8000210 |
| 180° | xx————xx——xx— | C000318 |

TABLE 5

Primitive Correction Patterns for V.29/9600
(Phase Component)

| Angle | Bit Sequence | Hex Representation |
|---|---|---|
| ±45° | —x—————x——x— | 1000042 |
| ±45° | —x—————x——x— | 2000084 |
| ±45° | -x—————x——x— | 4000108 |
| ±90° | —xx————xx——xx— | 30000C6 |
| ±90° | -x-x———x-x—x-x— | 500014A |
| ±135° | -xxx———xxx—xxx— | 70001CE |
| ±135° | —x—————x——x— | 2000084 |
| ±135° | -x—————x——x— | 4000108 |
| 180° | -xx————xx——xx— | 600018C |

TABLE 6

Primitive Correction Patterns for V.29/9600
(Magnitude Component)

| Mag | Bit Sequence | Hex Representation |
|---|---|---|
| Any error | x——————x——x— | 8000210 |

The determination of primitive correction patterns is easiest to illustrate using the V.27/2400 signal, which uses QPSK modulation with differential coding and a randomizer represented by $1+x^{-6}+x^{-7}$. This signal transmits two bits per symbol.

FIG. 3 depicts a so-called signal constellation 300 representing QPSK, one known type of modulation. A signal constellation is a graphical representation of the possible symbols for a given modulation scheme. The horizontal and vertical axes correspond to the orthogonal components of the carrier signal. Each possible symbol is represented by a point at the position of its associated (A,B) coordinates. As shown in FIG. 3, QPSK is represented as an array of 4 points. Since $\log_2(4)=2$, the choice of one particular symbol for transmission during a given symbol period communicates two bits of information.

With the use of differential coding, the current transmitted symbol depends on the data to be transmitted and the previously transmitted symbol. If the bit pair, or dibit, 00 is to be transmitted the phase changes 0°, for 01, 90°, for 11, 180°, and for 10, 270°.

A consequence of differential encoding is that the effects of errors persist for longer than one symbol period. When an isolated symbol error occurs, the received symbol is 90°, −90° or 180° removed from the intended symbol. If the received symbol is, say, 90° advanced from the intended symbol, then the first differential output includes a +90° phase error and the second differential output includes a −90° error.

FIGS. 4A–4B illustrate this situation with a transmitted and received sequence of three symbols. FIG. 4A shows the transmitted sequence. FIG. 4B shows the received sequence. The arrows in FIGS. 4A–4B show the change in phase over the three symbols. The second of the three symbols is received incorrectly, 90° away from its proper phase. In FIG. 4A, the intended symbol sequence produces a differential output of 180° followed by 270°. Thus the intended output of differential decoder 106 would be 11 followed by 10.

FIG. 4B shows that the received sequence produces a differential output of 270° followed by 180°. This corresponds to an actually received output of 10 followed by 11. Thus, each differential output contains an error in its second bit.

These errors are then propagated by the derandomizer. For V.27/2400, the derandomizer is characterized by the generator polynomial, $1+x^{-6}+x^{-7}$, where the exponents represent delay values and the + sign represents binary arithmetic. The output of the derandomizer is the binary sum of the current input and the inputs of six and seven periods previous to the current input.

Thus each of the two differential output errors of FIG. 4B causes a pattern of bit errors represented by the first bit sequence in Table 2. A 90° error that occurred in the context of a different sequence of transmitted symbols could generate errors in either the first bit or the second bit of each differential output, but not both. These two possibilities are represented by the two ±90° sequences in Table 2. In each sequence, the offending bit is propagated by the derandomizer to the sixth and seventh bits that follow it. Similarly, a 180° error generates errors in both bits of each differential output, producing the third sequence in Table 2. Note in the 180° case that the bit that is seven bits beyond the first differential output error is in the same location as the bit that is six bits beyond the second differential output error. These two propagated errors therefore cancel each other out and the bit in that location is correct.

Except for the bit sequence in Table 6, none of the primitive patterns occurs alone in the data stream. This is the effect of differential phase coding. A +90° differential error must be followed eventually by a -90° differential error or by some combination of differential errors that sum to -90°. A similar statement holds for differential errors at all other phase angles.

Primitive correction patterns are combined in a controlled manner to produce a table of correction patterns to be applied to the received data. Extending the V.27/2400 example discussed above, the simplest (and most likely) error, is where one isolated symbol is received as one of its nearest neighbors. The absolute phase error might be +90° or -90°—the list of possible error patterns is the same in either case. One such pattern uses the first bit sequence of Table 2 in two adjacent differential outputs. The resulting error pattern is —x————xx $\oplus$ ————x————xx=— x—x————xxxx, where $\oplus$ represents modulo-2 addition. Three other combinations of ±90° bit sequences in Table 2 are —xx————x—x—, x————x————xx—xx, and x—x————xxxx—.

Notice that two of the resulting correction patterns in the V.27/2400 example are shifted versions of each other. The correction pattern table does not combine these patterns since the correction procedure described below attempts to align its trials with the symbol boundaries of the input data stream. In the V.27/2400 example, this means that after alignment, the procedure applies trial correction patterns starting at every other bit in the file (since each symbol corresponds with two bits). For this reason, the table must include all shifted patterns to correct all possible errors.

Using the primitive correction patterns in Tables 2-6, final correction patterns can be generated that correspond with specific channel impairments. In the V.27/2400 example, additive noise introduces isolated ±90° errors. The final correction patterns associated with additive noise are, therefore, the four permutations of the ±90° primitives in Table 2 in two adjacent differential outputs. The correction pattern table for V.27/2400 with additive noise, therefore, contains four correction patterns.

Those of skill in the art will understand how to combine the primitive patterns in Tables 2-6 to provide correction patterns for other modem types for any type of channel impairment. Table 7 depicts the number of correction patterns necessary to correct additive noise for the different types of modems.

TABLE 7

| Signal Type | Number of Correction Patterns Needed |
| --- | --- |
| 9600 | 23 |
| 7200 | 13 |
| 4800 | 9 |
| 2400 | 4 |

Of course, correction patterns could be similarly generated in accordance with the invention for other demodulation schemes or combination of receiver elements and for any kind of channel impairment.

An Overview of the Correction Process

The correction technique of the invention operates on the demodulated bit stream as it would be input to source decoder 210 in FIG. 2. For each facsimile scan line, the correction process of the preferred embodiment decodes the line and checks it for validity by comparing the number of decoded pixels on the line to the expected image width. For the facsimile standards considered here, this width is 1728 pixels. Since the source codes employed in facsimile transmission encode groups of pixels into variable length code words, bit errors will normally cause the decoded number of pixels to vary from 1728. The process continues by decoding and checking lines until it detects an invalid line.

For each invalid line, the process applies candidate correction patterns at many different alignments in separate trials. The corrections are applied to the differential decoder output. One way of applying the patterns would be test every candidate pattern at every possible alignment to the invalid line. However, the invention provides methods for localizing the likely location of the error within the line and thus limiting the number of alignments to be tested. These methods are described in reference to FIGS. 8A-8D and FIGS. 9A-9B.

Each application of a candidate correction pattern at a particular alignment results in a candidate corrected image line. One of the candidates must be selected as the maximum likelihood corrected image line. A first stage of selection is to remove the source coding from the candidates and test their width of pixels. Those with widths not equal to the standard width may be removed immediately. If no candidates remain, a line enhancer algorithm is applied to a decoded version of the corrupted line. Details of the line enhancer algorithm are explained with reference to FIG. 10.

One might expect, given the large number of pixels in the standard width and the effects of bit errors on the source decoding process, that only one candidate would typically decode into the standard number of pixels. The inventors have however discovered that many candidates will often have the correct number of pixels. Further evaluation of candidates is therefore necessary.

The invention provides a scoring methodology for selecting among candidate corrected image lines that decode to the standard number of pixels. Various templates are applied to successive positions along the decoded image line and a score is calculated for each template and position. The templates reward plausible image patterns and penalize implausible image patterns. The selected candidate corrected image line is the one with the highest score summed over all alignments of a group of templates. Further details of the scoring methodology are described in reference to FIGS. 11-13.

Figure 7:
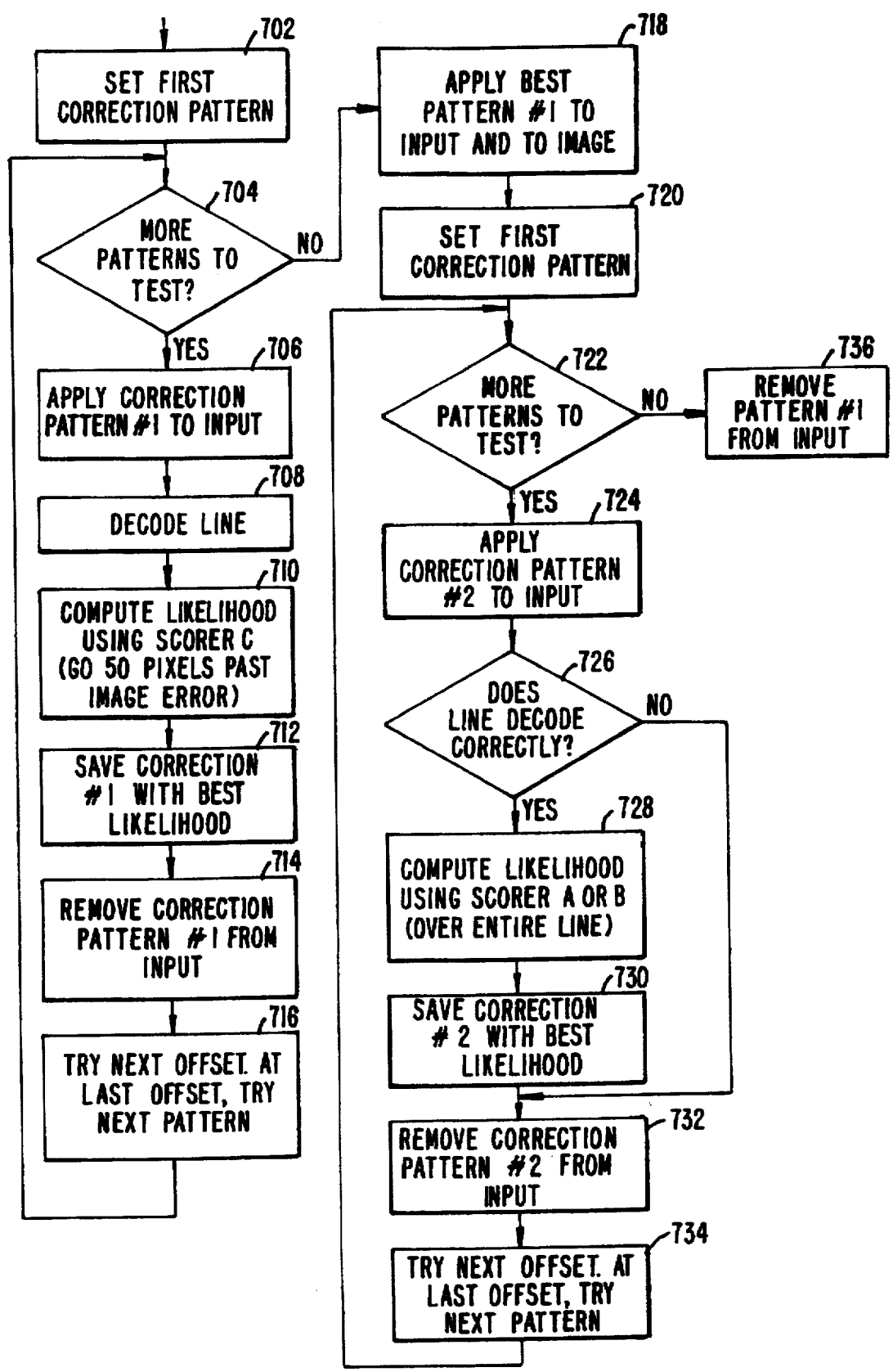
FIG. 7 is a flowchart describing the steps of correcting double errors in the same image line in accordance with the invention.
Figure 8A:
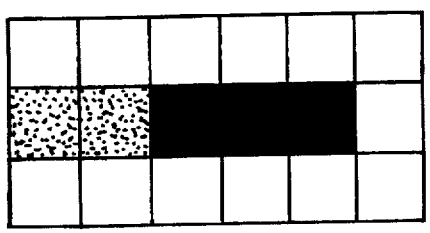
FIGS. 8A-8D depict four pixel templates for narrowing an error test range of a corrupted image line in accordance with the invention.
Figure 8B:
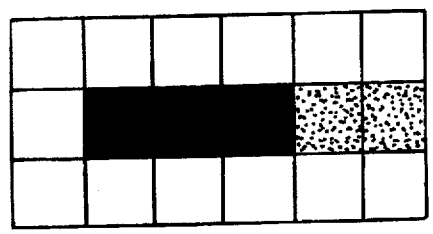
Figure 8C:
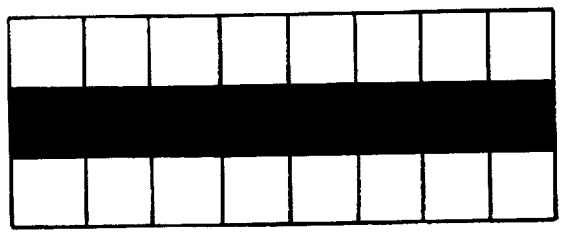
Figure 8D:
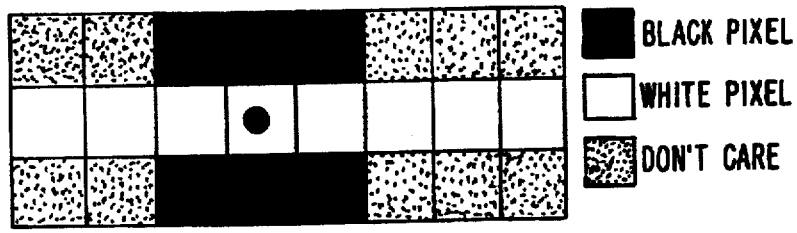

The above is a brief summary of how single symbol errors are corrected in accordance with the invention. A modification of this approach, described in detail with reference to FIG. 7 is used to correct double symbol errors.

FIG. 5 is a top-level flow chart describing the steps of correcting errors in encoded facsimile signals in accordance with the invention. At step 502, the source coding is removed from an individual image line. The correction process checks the line for validity by comparing the number of decoded pixels on the line to the expected image width. If no error is found and the line decodes correctly, execution of step 502 repeats at the next line. If the line does not decode correctly, execution proceeds to step 506. At step 506, the correction process of the invention identifies a narrowed range of the corrupted image line within which to correct for errors. Step 506 is explained in detail in reference to FIGS. 8A–8D.

Execution then proceeds to step 508, where a scorer, i.e. a group of scoring templates, is selected for later use in identifying the maximum likelihood corrected image line. As will be explained in reference to FIGS. 11–13, a scorer herein referred to as scorer A is used when the image line below the current line is correct. A scorer herein referred to as scorer B applies when the image line below the current line is incorrect. Another scorer C is used in connection with the correction of double symbol errors on a single corrupted image line.

At step 510, the correction process attempts to correct the image by applying candidate correction patterns to correct a single error at successive alignments within the narrowed test range defined in step 506. The candidate correction patterns are retrieved from a table constructed by combining the primitive correction patterns from the applicable Table of Tables 2–6. If a correction cannot be successfully applied within the narrowed test range, i.e. no candidate corrected line decodes to the proper number of pixels, execution proceeds to step 512 where the correction process attempts to apply candidate correction patterns to correct an error anywhere on the corrupted image line. If this effort is also unsuccessful, execution proceeds to step 514, where the correction process attempts to identify and correct a double error pattern anywhere on the corrupted image line.

If the corrections applied at either of steps 510, 512 and 514 are successful, execution then proceeds to step 516 where the correction is actually applied to the source decoder input data. The corrected data is then applied to the input of source decoder 210. If none of steps 510, 512 and 514 succeed in correcting the corrupted image line, execution proceeds to step 518, where a line enhancer is applied to the decoded image line. Execution then proceeds to step 502 where the correction process advances to the next line.

Thus, in accordance with the invention, the correction process first applies single corrections within a narrow range of input bits. If it finds no valid lines, then the process repeats over the entire line. If no valid lines are found again, it tries double corrections. In some embodiments, double corrections are either optional or skipped entirely. If the correction process finds no valid lines after trying single and double corrections, then the decoded image line is modified by the line enhancer.

Figure 6:
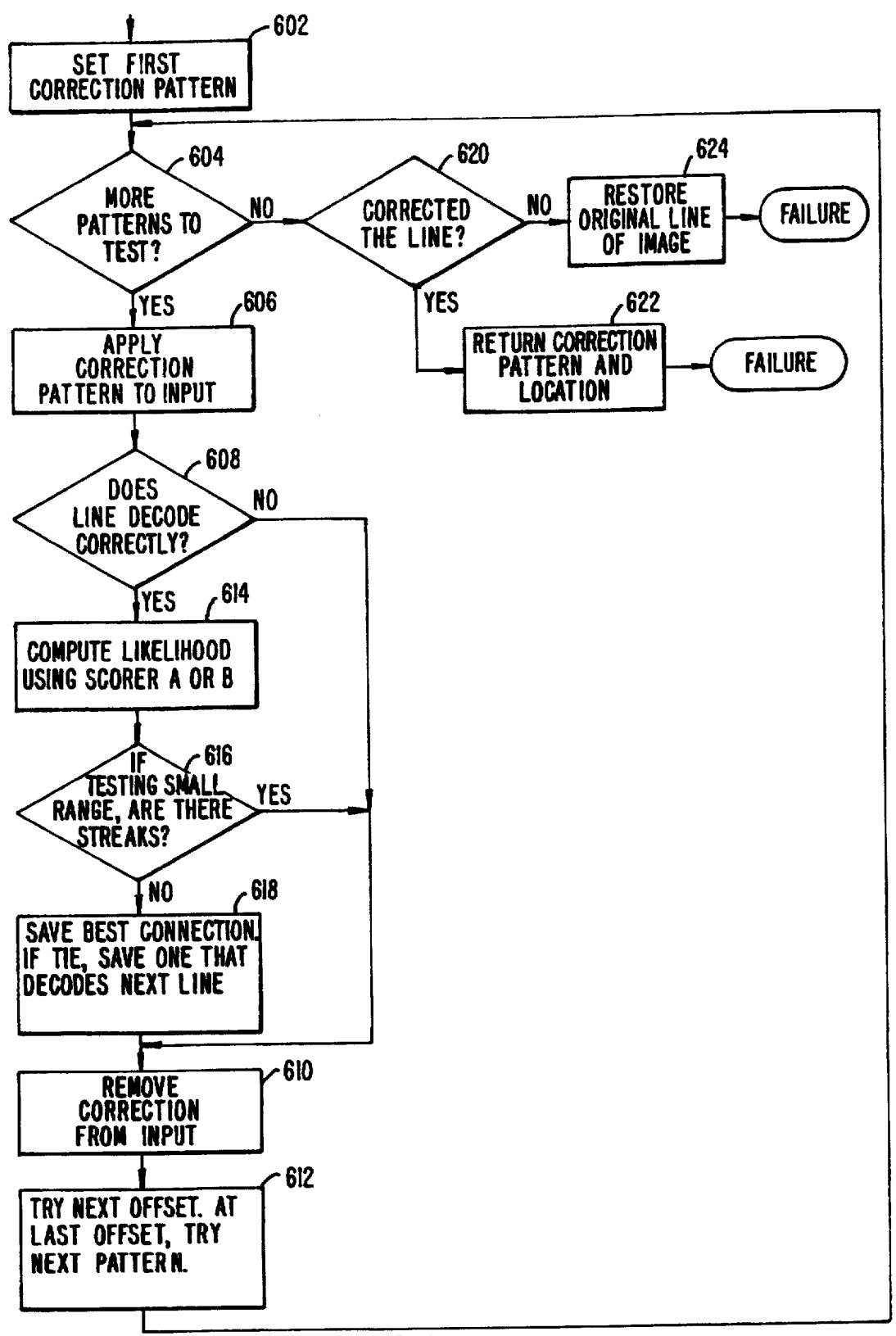
FIG. 6 is a flowchart describing the steps of correcting a single symbol error in accordance with the invention.

FIG. 6 is a flowchart describing the steps of correcting a single symbol error in accordance with the invention. FIG. 6 shows the detailed execution of steps 510 and 512 of FIG. 5. At step 602, a first candidate correction pattern associated with the relevant modem is retrieved. In the first pass, there are more correction patterns to test so the decision criterion of step 604 is satisfied. The current correction pattern is applied at step 606 at a particular alignment to produce a candidate corrected image line. As was described in reference to FIG. 5, the alignments within a narrowed test range are tested first. If none of them are successful, alignments over the entire image line are attempted. At step 608, source coding is removed from the corrected image line. If the decoded corrected image line does not have the proper number of pixels, execution proceeds to step 610, where the correction pattern is removed. Then, at step 612, the correction process shifts to the next alignment. If the last alignment has been attempted, the correction process shifts to the next correction pattern at step 604.

If at step 608, the corrected image line does decode to the proper number of pixels, execution proceeds to step 614. At step 614, the likelihood of the decoded corrected image line is tested using scorer A or B. Scorer A is applied if the line below, i.e., the line following the corrected image line, decodes to the proper number of pixels and scorer B if the line below does not. The details of the scoring process are described below in reference to FIGS. 10–12. At step 616, the correction process tests for the presence of a black streak if alignments are currently restricted to a narrow test range. Candidate corrections that produce streaks are considered suspect and are therefore ignored while alignments are restricted to the narrow test range. If a suspect correction should actually be the proper correction, it will be found again while testing the wider range. At step 618, the likelihood score for this candidate correction is compared to previously generated likelihood scores. The correction pattern and alignment that generates the highest likelihood score is retained. If any two candidates produce the proper number of pixels on the corrected line but one also produces the proper number of pixels on the next line, then the one that successfully decodes the next line is preferred. The correction is then removed at step 614.

Finally, when patterns and alignments are exhausted, the decision criterion at step 604 fails. Step 620 checks to see if the line has been successfully corrected in the foregoing steps. If it has, the previously stored maximum likelihood correction pattern and alignment is reported at step 622, to be applied in step 516 of FIG. 5. If not, the original line is restored at step 624. In either case, the result is data ready for input to source decoder 210.

Not every bit alignment is tested because, in accordance with the invention, patterns are only applied at symbol boundaries once they can be determined. This reduces the number of alignments that must be attempted by a factor of 2–4. The first bit of each pattern is intended for the first bit of a symbol. When the first bit of the output stream of differential decoder 206 is not the first bit of a symbol, the correction algorithm must seek to locate the symbol boundaries. This means that it must apply correction patterns at all bit offsets until it determines the bit phase corresponding with the symbol boundaries. This bit phase, b, is a number from 1 to N, where N is the number of bits per symbol. It is referenced to the beginning of the input file and appears in the definition of the kth symbol location, which is offset by (kN+b) bits from the reference.

In the preferred embodiment, the symbol phase is communicated from the differential decoder 206 to the correction process. Since this symbol phase determines the symbol boundaries, the correction algorithm need not locate them.

In an alternative embodiment, the correction algorithm determines the symbol phase by observing the alignment of successful correction patterns. The useful patterns are those that are expected only at certain bit offsets from the symbol boundary. For example, an isolated magnitude error in V.29/9600 generates the error pattern x————————————x————x————. When properly corrected, the first bit of the pattern must align with a symbol boundary. No other symbol error generates this pattern. Therefore, the successful correction of a line with this pattern suggests the proper symbol phase, namely the one aligned with the first bit of the pattern. Other correction patterns are also used to locate symbol boundaries, although many of them are valid at two or three different phases. The correction algorithm accounts for this by accumulating a score for each bit phase. Each score is incremented, decremented or left unchanged based on the pattern's valid phases. The correction algorithm declares the symbol phase for the image as a whole when: (a) one score reaches six or, (b) one score reaches four and all others are zero or less.

The present invention also provides a procedure for correcting double symbol errors on a single line. This procedure executes no more than once per line and corresponds to step 514 of FIG. 5. It assumes that the first symbol error lies within the narrow test range defined at step 506 and that the second error does not overlap with the first. The procedure applies all candidate patterns over the narrow range and saves the correction with the highest likelihood using scorer C, described below with reference to FIGS. 12A–12D. This first correction is not required to produce the expected pixel count. With this correction in place, the double error correction procedure then reapplies all candidate patterns from the first correction to the end of the scan line. At each application, it tests the modified line for validity based on the expected pixel count. If valid, it determines the likelihood of the line using the current full-line scorer (A or B), and saves the correction that produces the highest likelihood.

FIG. 7 is a flowchart describing the steps of correcting double errors in the same image line in accordance with the invention. At step 702, a first candidate correction pattern associated with the relevant modem is retrieved. In the first pass, there are more correction patterns to test so the decision criterion of step 704 is satisfied. The current correction pattern is applied at step 706 at a particular alignment to produce a candidate corrected image line. At step 708, the candidate corrected image line is decoded. At step 710, the likelihood score for this first correction is computed using scorer C. Note that there is no test for whether the candidate line decodes to the proper number of pixels. At step 712, the score of the candidate line is compared to the previous high-scoring candidate. The current correction pattern and alignment are retained if the score is the highest so far. The correction pattern is then removed from the image line at step 714. Execution then proceeds to the next alignment within the narrow test range at step 716, and if alignments have been exhausted, to the next possible correction pattern.

If it is determined at step 704 that all patterns and alignments within the narrow test range have been applied, the highest likelihood pattern and alignment are applied at step 718. Thus, one error has been corrected and a second error remains to be corrected. Then, at step 720, the first candidate correction pattern is reset. In the first pass, there are more correction patterns to test, so the decision criterion of step 722 is satisfied. So execution proceeds to step 724, where the current candidate correction pattern is applied to produce a candidate correction line. At step 726, source coding is removed from the candidate correction line, and the resulting number of pixels is compared to the standard number. If decoding produces the correct number of pixels, the likelihood value is computed at step 728 for the line using either scorer A or B, depending on which is currently selected. At step 730, the current correction and alignment are stored if they result in the maximum likelihood candidate correction so far.

Then, at step 732, the correction pattern is removed. If, at step 726, removal of source coding resulted in an improper number of pixels, the correction pattern is removed at step 730 without prior scoring. At step 734, execution proceeds to the next bit alignment, and if all alignments to the end of the scan line have been tried, to the next possible correction pattern. Once there are no more correction patterns to step, the decision criterion at step 722 fails. Then, at step 736, the first correction pattern identified in steps 702–716 is removed, and the pattern and alignment of each correction s reported to step 516 of FIG. 5, which applies them to the coded input.

Error Location Within a Scan Line

For each invalid line, the correction technique of the invention can determine a range of bit offsets for the correction trials. This corresponds to step 506 in FIG. 5. This narrow test range is determined by finding the likely error in the image and translating its pixel location to an input bit location. In many cases, however, the error is not apparent from the image. In others, the error may have occurred many pixels earlier than it could be detected in the image. In either instance, the test range may not contain the bits associated with the error. When this occurs, there may be no candidate patterns that produce a valid line. As illustrated in the FIG. 5, the functional flow allows for this possibility by retesting over the entire input line whenever a correction cannot be found within the narrow range.

The narrow test range includes the input bits deemed most likely to contain the transmission error. The range is determined from an image error, which is the pixel location where the image first appears incorrect. This image error is located by sweeping a pixel window across the invalid line and the two adjacent lines. At each pixel offset, the location technique of the invention tests for specific combinations of pixels. Three pixel templates detect black streaks in the image and one pixel template tips off regions of "floating" black. The black streak templates are sufficient to declare an image error. The floating black template initiates a test over a larger range of pixels to verify the presence of an image error.

The four pixel templates are shown in FIGS. 8A–8D. The first template, shown in FIG. 8A, checks for the tail end of a black streak containing three or more pixels. The second template, shown in FIG. 8B, checks for the beginning of the same streak. The third template, shown in FIG. 8C, checks for the center of a long black streak containing eight or more pixels. When any of these templates are satisfied, the correction algorithm declares an image error at the current pixel location. The fourth template, shown in FIG. 8D, checks for a white streak that is surrounded by three or more black pixels on top and bottom. Whenever this fourth template is satisfied, the pixel labeled with a dot in FIG. 8D becomes the origin for the subsequent test.

Figure 9A:
FIGS. 9A-9B depict how a floating black regions is isolated in accordance with the invention.
Figure 9B:
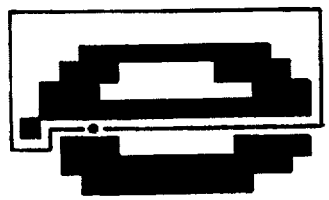

The verification of a floating black region guards against the high rate of false alarms observed using the template alone. The verification procedure of one embodiment of the invention attempts to isolate a floating black region containing the black pixels in the top row of the template. As illustrated in FIGS. 9A–9B, the procedure tests for white pixels outward (left and right) and upward from the origin specified by the template. The procedure stops whenever it is "blocked" by black pixels on either path or when the two path endpoints can be connected with a row of white pixels. If one path is blocked, as in FIG. 9A, the image does not contain the required black region. If the paths connect, as in FIG. 9B, the procedure declares an image error. The template alone would declare an error in both images, whereas the verification procedure eliminates the image in FIG. 9A since its black region is "attached" to black pixels below the current line.

The end of the narrow test range may be delimited in various ways. If an end-of-line (eol) code word is encountered before accumulating the predetermined line length in the decoded image line, the eol will represent the end. A legal run length code word that augments the decoded line length past the standard length may determine the end of the test range. Alternatively, an illegal code word that could not have been produced by the Huffman code employed may determine the end of the test range.

Of course, other configurations of templates, shape criteria, and ending criteria could be used to define a narrowed test range in accordance with the invention.

Line Enhancement

When none of the candidate corrections produces the proper number of pixels on the corrected line, a line enhancer is used to improve the appearance of the decoded line. The line enhancer is an image processing procedure that is applied directly to the decoded image line. This is a distinct technique from the application of correction patterns to the source coder input.

The line enhancer is applied after the start of the narrow test range. Decoded image pixels before this point are left unchanged while pixels beyond this point are modified to produce the best image.

Figure 10:
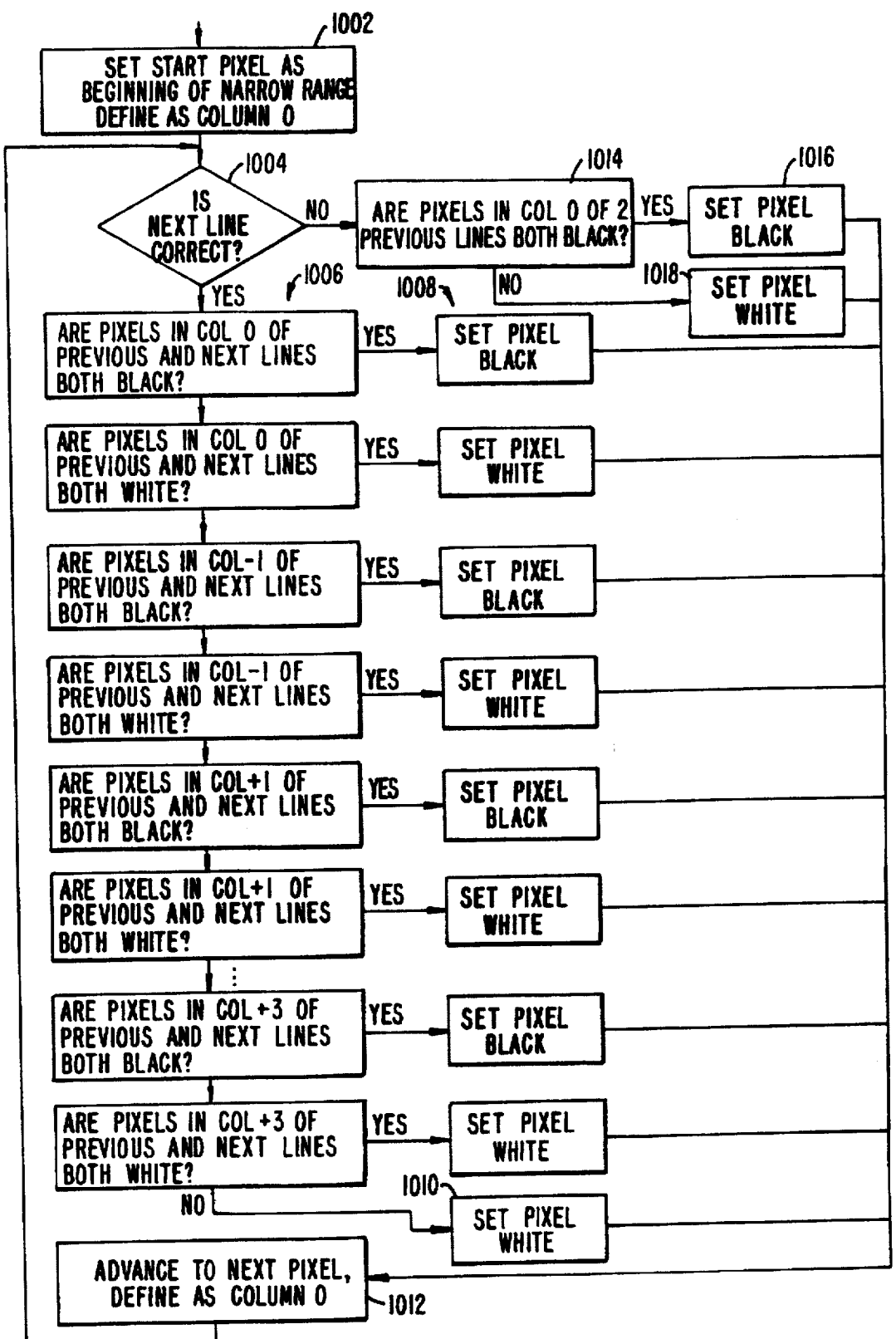
FIG. 10 depicts how an otherwise uncorrectable line is processed by a line enhancer in accordance with the invention.

FIG. 10 is a flowchart describing the steps of applying a line enhancer to a corrupted image line in accordance with the invention. The line enhancer operates on the corrupted image line with source coding removed. At step 1002, the line enhancer sets a start pixel at the beginning of the narrow test range. This will be the first pixel to be adjusted. At step 1004, the line enhancer determines if the line following the corrupted image line decodes to the proper number of pixels.

If the line following the corrupted image line does decode to the proper number of pixels, execution proceeds to routine 1006. The steps in routine 1006 examine pixels on adjacent lines in the neighborhood of the current pixel to be adjusted beginning with the column of the current pixel itself and moving outward until pixels within three columns of the current pixels have been examined. When the line enhancer identifies a column where the pixel above the corrupted line matches the pixel below the corrupted line, i.e. both black or both white, the steps of routine 1008 set the current pixel to the same color as the two tested pixels in the column. If no such matches are found within a three column region, the current pixel is set to white at step 1010. After the pixel has been set by either routine 1008 or step 1010, execution advances to the next pixel at step 1012 and the process repeats for the new pixel beginning at step 1004.

If the line following the corrupted image line does not decode to the proper number of pixels, execution proceeds to step 1014. At step 1014, the line enhancer examines the pixels above the current pixel in the two preceding lines. If they are both black, the current pixel is set to black at step 1016. If they are not both black, the current pixel is set to white at step 1018. In either case, execution advances to the next pixel at step 1012.

Scoring Candidate Corrected Lines

The error correction technique of the preferred embodiment uses one of two scorers (designated A and B) to measure the likelihood of full lines. It employs another scorer (C) for choosing the first of two correction patterns on a line. One full-line scorer (A) applies when image line below the current line is correct, while the other full-line scorer (B) applies when it is incorrect. The justification for separate scorers is presented below.

Scorers A and B sweep a pixel window across the modified line and accumulate likelihood values for the line. Scorer C is similar, except that its sweep ends 50 pixels beyond the first correction. Scorer A uses a 3×3 pixel window and applies to image lines that are surrounded by correct image lines on top and bottom. Scorer B uses a 3×2 pixel window and applies where the bottom image line is incorrect. Scorer C uses a 3×3 pixel window regardless of the surrounding lines.

Each scorer uses a different table relating the windowed pixel states to the adjustment of the likelihood value. For Scorers A and B, all pixels except for the center pixel on the current line are used to generate the table address. By convention, the stored values for Scorers A and B are the likelihood adjustments to apply when a black pixel appears at this center pixel. When the center pixel is white, the opposite adjustment is applied. Scorer C does not exhibit this symmetry. The stored values for Scorer C represent the likelihood adjustments for situations where the image pixels match all nine pixels in the template. In all scorers, the stored adjustment values range from −2 to +10 and are assigned to groups of similar pixel combinations.

FIGS. 11A–11D define the 3×3 pixel groups for Scorer A and their adjustment values. The center row of each template applies to the current image line. Neighboring rows apply to image lines above and below the current line. Scorer A computes an eight-bit table address using the pixels on the perimeter of the window. The table output specifies the adjustment to the likelihood value for a black center pixel, while the opposite adjustment applies for white center pixels. To simplify FIGS. 11A–11D, each template is displayed with its expected center pixel. The pixel combinations in the first group, for example, expect a white center pixel. These combinations are rewarded by 2 when the center pixel is white and penalized by 2 when the center pixel is black. In group b, at least one pixel in each shaded row must be black and at least three pixels must be black between the two shaded rows. Otherwise, the group b template does not alter the score at the current offset. In group c, a shaded row must contain fewer than three black pixels for this template to alter the score. In group d, at least one of the shaded pixels must be black for this template to alter the score.

FIGS. 12A–12C define the 3×2 pixel groups for Scorer B and their adjustment values. The bottom row of each template applies to the current image line. The top row applies to the image line above it. The "center" pixel is in the middle of the bottom row. Scorer B computes a five-bit table address using the pixels that surround the center. The table output specifies the adjustment to the likelihood value for black and white center pixels. To simplify FIGS. 12A–12C, each template is displayed with its expected center pixel. Any pixel combinations that are not represented in the figure have stored adjustment values of zero. When the image line below the current line is correct, Scorer B produces a likelihood value that is less reliable than the Scorer A. Therefore, the correction algorithm uses Scorer A. In cases where the following line is incorrect, however, Scorer B is more reliable.

FIGS. 13A–13B defines the 3×3 pixel groups for Scorer C and their adjustment values. The center row of each template applies to the current image line. Neighboring rows apply to image lines above and below the current line, regardless of whether they contain errors. This scorer computes a nine-bit table address using all pixels in the window. The table output specifies the unconditional adjustment to the likelihood value. In each template, one or more of the pixels labeled "One or more black" must contain black. Likewise, one or more of the pixels labeled "One or more white" must contain white.

The three scorers assume that the facsimile image contains black regions that are more than one pixel wide with some edges within ±45 of vertical. The scorers reward any black region that is 3×3 or larger, both when centered on the region and when sweeping past its edges. Note that vertical edges are not required for correcting a scan line. In fact, the correction algorithm easily corrects single symbol errors on a blank line. The vertical edges do, however, provide an increasing advantage as the error rate increases. The reason is that vertical edges are the basis for judging between candidate first corrections of a double symbol error.

Of course, the scoring templates shown here are merely representative of scoring templates and methods that could be used within the scope of the invention. Any combination of scoring templates that optimally selects corrected image lines could be used.

EOL Alignment

Some facsimile machines transmit a whole number of bytes for each scan line. In accordance with the invention, this knowledge may be used to eliminate false corrections that modify the end of line (EOL) bit sequence. Approximately one false correction is eliminated for every 100 lines in error.

The EOL phase is best determined in a separate pass over the image before error correction. The separate pass provides a more reliable answer than checking only the top portion of the image, as could be done for the symbol phase. The reason is that many facsimile machines zero-pad their lines to a minimum length, which is always a multiple of eight. This zero padding is invoked most often on blank lines, as typically appear at the top of facsimile pages. As a result, a facsimile machine that does not transmit a whole number of bytes for all lines may do so for a portion of the image containing minimum-length lines. An EOL test that uses only a portion of the image is therefore vulnerable to false reports of EOL alignment due to these lines. To avoid this problem, EOL alignment is tested over the entire image before error correction.

The EOL alignment pass requires a small fraction of the time associated with decoding the image. The error correction software determines EOL alignment using a routine that simply finds each EOL bit sequence and returns its bit phase referenced to the beginning of the file. For each EOL sequence, the bit phase is a number from 0 to 7. The bit phases accumulate in a histogram and EOL alignment is declared when 90% or more of the lines share the same phase.

Results

FIG. 14 depicts a decoded image from a V.29/9600 image with additive noise. As can be seen, several lines of the image are illegible. FIG. 15 depicts the same received image corrected in accordance with the invention. Double error patterns were applied only after single error patterns failed. The method of the invention corrected 87 single errors, 1 double error, and left three errors uncorrected. The improvement in image clarity is clear and all lines are legible now.

The invention has now been explained with reference to specific embodiments. Other embodiments will be apparent to those of ordinary skill in the art in view of the foregoing description. It is therefore not intended that this invention be limited except as indicated by the appended claims.

What is claimed is:

1. In an image communication system, wherein images are encoded prior to transmission using a source code, and transmitted in encoded form via a communication channel that includes a modulator operating according to a predetermined modulation format, a transmission medium, and a demodulator operating according to the predetermined modulation format, a method for correcting errors in a line of the received image comprising the steps of:

receiving the image line as a demodulated sequence of code words via the communications channel;

decoding the image line to remove the source code and establish a decoded representation of the image line;

determining, in accordance with a predetermined error criterion, if the decoded representation of the image line includes a transmission error;

upon an indication of a transmission error in said determining step, applying a plurality of correction patterns associated with the predetermined modulation format to the encoded form of the image line to obtain a corresponding plurality of corrected encoded image lines;

decoding the plurality of corrected encoded image lines to obtain a plurality of candidate decoded representations of the image line;

discarding candidate decoded representations of the plurality of candidate decoded representations that have errors as determined by said predetermined error criterion; and when said discarding step leaves no candidate representation, correcting the image line by interpolating between surrounding lines.

2. In an image communication system, wherein images are encoded prior to transmission using a source code, and transmitted in encoded form via a communication channel that includes a modulator operating according to a predetermined modulation format, a transmission medium, and a demodulator operating according to the predetermined modulation format, a method for correcting errors in a line of the received image comprising the steps of:

receiving the image line as a demodulated sequence of code words via the communications channel;

decoding the image line to remove the source code and establish a decoded representation of the image line;

determining, in accordance with a predetermined error criterion, if the decoded representation of the image line includes a transmission error;

upon an indication of a transmission error in said determining step, applying a plurality of correction patterns associated with the predetermined modulation format to the encoded form of the image line to obtain a corresponding plurality of corrected encoded image lines;

decoding the plurality of corrected encoded image lines to obtain a plurality of candidate decoded representations of the image line;

discarding candidate decoded representations of the plurality of candidate decoded representations that have errors as determined by said predetermined error criterion;

remodulating the maximum likelihood candidate representation; and retransmitting the remodulated maximum likelihood candidate representation via another transmission medium.

3. In an image communication system, wherein images are encoded prior to transmission using a source code, and transmitted in encoded form via a communication channel that includes a modulator operating according to a predetermined modulation format, a transmission medium, and a demodulator operating according to the predetermined modulation format, a method for correcting errors in a line of the received image comprising the steps of:

- receiving the image line as a demodulated sequence of code words via the communications channel;
- decoding the image line to remove the source code and establish a decoded representation of the image line;
- determining, in accordance with a predetermined error criterion, if the decoded representation of the image line includes a transmission error;
- upon an indication of a transmission error in said determining step, applying a plurality of correction patterns associated with the predetermined modulation format to the encoded form of the image line to obtain a corresponding plurality of corrected encoded image lines;
- decoding the plurality of corrected encoded image lines to obtain a plurality of candidate decoded representations of the image line;
- discarding candidate decoded representations of the plurality of candidate decoded representations that have errors as determined by said predetermined error criterion; and
- when said discarding step leaves more than one candidate representation, applying a scoring function to the remaining candidate representations of the plurality to identify a maximum likelihood candidate representation of the image line.

4. An apparatus for improving the quality of a received facsimile image comprising:

- a demodulator that extracts source coded image lines from a modulated facsimile signal;
- a source decoder coupled to the demodulator that converts source coded image lines to decoded image lines;
- an error identifier coupled to the source decoder that detects the presence of an error in a decoded image line;
- a memory that stores a plurality of correction patterns, each correction pattern, when logically combined with a particular subset of bits of a source coded image line, operating to correct an reception error as it would propagate through said demodulator;
- an error corrector coupled to the demodulator that applies correction patterns from said memory to source coded image lines at a plurality of alignments; and
- an error correction controller that 1) applies said source decoder to a first source coded image line received via said demodulator to generate a first decoded image line, 2) applies said error identifier to the first decoded image line, 3) when said error identifier identifies an error, applies said error corrector to said first source coded image line to obtain a plurality of candidate corrected source coded image lines, 4) applies said source decoder to said candidate corrected source coded image lines to obtain corresponding candidate corrected decoded image lines, and 5) applies said error identifier to said candidate corrected decoded image lines and discards the candidate corrected source coded and decoded image lines for which the error identifier identifies errors.

5. The apparatus of claim 4 further comprising:

- a scorer that determines plausibility scores for decoded image lines; and wherein
- said error correction controller also 6) applies said scorer to remaining candidate corrected decoded image lines to identify a maximum likelihood candidate decoded image line.

* * * * *